United States Patent [19]

Tomita et al.

[11] 4,226,408
[45] Oct. 7, 1980

[54] HYDRAULIC SHOCK ABSORBER FOR VEHICLES

[75] Inventors: Takao Tomita, Niiza; Isamu Morita, Asaka, both of Japan

[73] Assignee: Honda Giken Kogyo Kabushiki Kaisha, Tokyo, Japan

[21] Appl. No.: 5,970

[22] Filed: Jan. 24, 1979

[30] Foreign Application Priority Data

Feb. 1, 1978 [JP] Japan ............... 53-10949[U]
Feb. 3, 1978 [JP] Japan ............... 53-12513[U]
Feb. 3, 1978 [JP] Japan ............... 53-12515[U]

[51] Int. Cl.$^2$ .................... F16F 9/08; F16F 9/342
[52] U.S. Cl. ........................ 267/64 B; 188/289;
188/315; 188/322; 267/8 A; 280/708
[58] Field of Search ............... 188/298, 289, 284, 322,
188/314, 315, 269; 280/708; 267/8 R, 8 A, 64
R, 64 B, DIG. 2

[56] References Cited

U.S. PATENT DOCUMENTS

| | | | |
|---|---|---|---|
| 1,918,699 | 7/1933 | Gruss ..................... | 267/64 R |
| 2,207,088 | 7/1940 | Coleman ................. | 267/DIG. 2 |
| 2,468,939 | 5/1949 | Mercier ................... | 188/321 |
| 2,649,936 | 8/1953 | Crabtree ................. | 188/315 |
| 2,909,368 | 10/1959 | Taylor ...................... | 267/64 R |
| 3,046,000 | 7/1962 | Polhemus et al. ....... | 267/64 B |
| 3,582,106 | 1/1971 | Keijzer .................... | 267/64 B X |
| 3,623,776 | 11/1971 | Wellman ................. | 188/349 X |
| 3,790,146 | 2/1974 | Hoffmann ............... | 188/322 X |
| 3,854,710 | 12/1974 | Nichols ................... | 267/DIG. 2 X |

FOREIGN PATENT DOCUMENTS

496688 10/1928 Fed. Rep. of Germany ........... 188/284

Primary Examiner—George E. A. Halvosa
Attorney, Agent, or Firm—Irving M. Weiner; John L. Shortley; Melvin Yedlin

[57] ABSTRACT

A hydraulic shock absorber including inner and outer tubes telescopically fitted together and an orifice variable in response to relative movement of the inner and outer tubes. A large diameter tubular holder is disposed coaxially around an upper portion of the outer tube to provide a space between the outer tube and the holder, the space being divided by a tubular partition membrane disposed coaxially in the space into a high-pressure gas chamber located outside of the membrane and a low-pressure gas chamber located inside of the membrane and communicating with an upper space within the outer tube. The shock absorber is of the hydraulically and pneumatically operated type, is simple in structure, and can be assembled with ease while maintaining a desired degree of performance. When the shock absorber is at the end of the extension stroke, there is a sufficient length of span between an outer tube sliding portion and an inner tube sliding portion between which the variable orifice is located so that even when the shock absorber is subjected to lateral bending forces, the orifice clearance is prevented from being varied or deformed, to ensure reliable and smooth operation of the shock absorber.

17 Claims, 9 Drawing Figures

HYDRAULIC SHOCK ABSORBER FOR VEHICLES

BACKGROUND OF THE INVENTION

1. Field of the Invention

The present invention relates generally to a hydraulically and pneumatically operated shock absorber for vehicles.

2. Description of the Prior Art

Hydraulic shock absorbers which are widely used comprise a hydraulic damper and a spring operatively combined therewith. Such prior shock absorbers provided with a spring provide a dampening characteristic which is commensurate with an applied force, and have a property not suitable for vehicles of certain types. By including a spring, the diameter of the shock absorbers must be enlarged and the size thereof made greater than would otherwise be necessary. Further, the shock absorbers are heavy due to addition of the spring and associated parts, and are complicated in structure. An additional problem with the shock absorbers described above is that spring-loading adjustment is relatively difficult, thereby producing irregularly spring-loaded shock absorber products.

There has been proposed a hydraulically and pneumatically operated shock absorber which utilizes a pneumatic spring. The shock absorber of this type solves the above-mentioned difficulties in that it maintains an increased degree of response during the compression stroke and is hydraulically controlled to produce a large dampening force while in the extension stroke. The pneumatic spring type of shock absorber is especially suitable for automobiles for use on roads with many holes and bumps, requiring shock absorbers which have a long compression stroke and rapid responsiveness.

The hydraulically and pneumatically operated shock absorber includes an air chamber and a fluid chamber which are generally divided by a free piston. Such partitioning, however, results in difficulty in sealing between the chambers, and the piston itself is not smoothly and reliably slidable.

Various efforts have been made to eliminate the above-discussed defects. As a result, different types of flexible and resilient members have been proposed for use as a partition between the air and fluid chambers. One such type comprises a disc-shaped flexible partition member which separates a compartment in an upper portion of the shock absorber body into upper and lower parts. With this type of partition member, however, the shock absorber becomes greater in overall length and larger in size. In addition, attachment and centering of the flexible partition member involves complex processes. Another type of partition member is composed of a similar disc-shaped flexible separator which is vertically arranged as a partition for a chamber mounted on a side of the shock absorber body. This latter type causes the structure of the shock absorber to be relatively complicated and large-sized. Further, it suffers from the same problems as the former type in connection with attachment and centering.

Another type of hydraulic and pneumatic shock absorber comprises inner and outer telescoping tubes, the inner tube having at its one end a partition member having an orifice and the outer tube being equipped with a tapered rod with a piston fixed thereto having an orifice. The fluid can be forced to pass through one of the orifices during either the compression or the extension stroke, the orifice with which the rod interferes being variable by relative movement of the inner and outer tubes. One of the problems attendant such shock absorber is that when the shock absorber is subjected to lateral bending forces while it is at the end of the extension stroke with the piston in abutment against the partition member and with the sliding parts of the inner and outer tubes becoming closer to each other, the cross-sectional shape of a clearance defined between the rod and the orifice wall becomes irregular. Thus, oil is caused to flow irregularly through the deformed cross-sectional shape of the orifice on the compression stroke, with the consequence that the shock absorber will not function properly. This difficulty also arises when the shock absorber is in the vicinity of the end of the extension stroke. Other problems include: the rod is frictionally engageable with the orifice wall; and the piston, rod and inner tube are subjected to stresses, preventing smooth and reliable shock absorbing operation.

Furthermore, with this latter type of shock absorber, there are three points of contact; one between upper sliding surfaces of the inner and outer tubes, one between lower sliding surfaces of the tubes, and one between sliding surfaces of the inner tube and the piston. Thus, one extra point of contact is provided as compared with other conventional shock absorbers. Accordingly, if the parts are made of rigid material, they will be subjected to severe stresses, especially when side forces in addition to axial forces are applied to the shock absorbers, thereby impeding smooth operation. Because the rod is relatively slender, it can be easily bent when the piston is held by the inner tube with the rod fixedly supported by the outer tube. At this time, irregular stresses are created on the sliding surface of the piston, thus preventing the piston from being able to slide smoothly. Such a condition can cause the rod to be deformed, and when repeated, may even break a piston supporting portion on the tube. The service life of the shock absorber may then be shortened, and the durability thereof lessened.

The present invention provides a shock absorber of improved performance which eliminates the above discussed various problems attendant the shock absorbers of the conventional type and of the hydraulic and pneumatic type.

SUMMARY OF THE INVENTION

The present invention provides a hydraulic shock absorber for vehicles which includes an inner tube and an outer tube, the inner and outer tubes being telescopically fitted together. Also included is orifice means variable in response to relative movement of the inner and outer tubes, and a piston adapted to produce a damping force in one direction during relative movement of the tubes. A tubular holder is coaxially disposed around an upper outer peripheral portion of the outer tube and has a diameter larger than the diameter of the outer tube. A partition membrane is substantially vertically disposed between the holder and the outer tube and is mounted coaxially therewith. The partition membrane is fabricated of a flexible and resilient material and is disposed so as to divide a space defined between the holder and the outer tube into a high-pressure gas chamber outside of the membrane and a low-pressure gas chamber inside of the membrane. The low-pressure chamber is in communication with an upper space within the outer tube.

A major object of the present invention is to provide a hydraulically and pneumatically operated shock absorber for vehicles which comprises an outer tube and a tubular holder mounted coaxially therewith and surrounding the outer periphery of the outer tube. A space is provided between the holder and the tube, the space being divided into inner and outer portions by a tubular partition membrane of flexible and resilient material which is concentric with the space. The outer space portion acts as a high-pressure air chamber, and the inner space portion acts as a low-pressure air chamber communicating with an upper portion of the tube.

Because the tubular partition membrane is concentrically disposed between the tube and the tubular holder according to the invention, no centering is required. The tubular partition membrane is fixed in place with its upper and lower end portions sandwiched between the tube and the tubular holder. With such an arrangement, the shock absorber of the hydraulic and pneumatic type can be readily assembled and is of a simple structure. A shock absorber of the above-mentioned type having high-pressure and low-pressure chambers can easily be obtained according to the invention with a high sealing property because the chambers are defined by the tubular partition membrane coaxially disposed between the outer tube and the holder member.

It is another object of the present invention to provide a hydraulic shock absorber which is small in size, light in weight, and effective in operation in that there are dual air chambers surrounding the tube. The shock absorber is shorter, and the air chambers are provided all around the tube, thereby keeping any increase in the overall diameter to a minimum and maintaining a sufficient volume for the air chambers.

Still another object of the present invention is to provide a hydraulic shock absorber having through holes in the tube for communication between a space inside the partition membrane and the interior of the tube, there being a network peripherally disposed around the perforated tube to prevent the partition membrane from being squeezed into the holes, whereby the longevity and durability of the partition membrane can be increased.

A still further object of the present invention is to provide a hydraulic shock absorber having an outer high-pressure chamber bounded by a partition membrane and containing a medium capable of both gas and liquid phases, to which is connected a separate adjustment chamber containing the medium. Latent heat of vaporization of the medium is utilized to take up heat of friction generated when the inner and outer tubes are slidably moved, thereby providing improved cooling characteristics for suppressing an increase in spring force due to heating. Accordingly, the shock absorber thus constructed is subjected to less changes in its characteristics due to heat variations, and thus is thermally stable.

Yet a further object of the present invention is to provide a hydraulically and pneumatically operated shock absorber for vehicles, having a partition member disposed at a distal end of an inner tube and having an orifice, through which vertically extends a tapered rod axially mounted on an outer tube. The orifice is variable by relative movement of the tubes. The rod has on its free end a piston having a first spacer which keeps the piston spaced from the partition member when they abut against each other. The inner tube has on its distal end an integral second spacer member disposed on the partition member, and the second spacer member has around its outer periphery a sliding portion against the inner wall of the outer tube. The partition member with the orifice is adapted to be disposed between the piston and the second spacer member when the tubes are at the end of the extension stroke.

With such construction, the axial span of the sliding portions of the inner and outer tubes at the end of the extension stroke is made sufficiently large for stable interference between the orifice and the rod. Even when the shock absorber is subjected to a bending force, the orifice is normally functionally maintained and the cross section formed between the rod and the orifice wall is constantly maintained to prevent the rod from interfering with the orifice wall so as to permit smooth flow of oil therethrough. Therefore, the shock absorber is reliably and normally actuatable with smooth movement of the piston and other moving parts. These advantages can be obtained with a simple structure which includes a skirt-like spacer on the piston and a spacer member on the partition member.

A still further object of the present invention is to provide a shock absorber of the type described above in which the spacer member acts as means for holding a bubble breaker and suppressor of metal mesh or metal fiber. In this manner, the flow of air bubbles into the orifice is effectively prevented, the damping force is reduced, and air is trapped.

Still another object of the invention is to provide a hydraulic shock absorber having an enlarged portion on the proximal end of the rod, the enlarged portion being supported by engaging means on a base portion of the tube so as to permit the rod to move slightly. With such an arrangement, when the shock absorber is subjected to a lateral bending force, the supported end of the rod is shifted in response to such forces, thereby preventing generation of stresses between the piston and the tube and thus minimizing friction caused thereby. Accordingly, the piston and the tube are smoothly slidable on each other. The rod is thus protected from excessive bending force and internal stresses.

A further object of the invention is to provide a simply constructed hydraulic shock absorber for vehicles having a rod-mounting structure which permits the shock absorber to be actuated smoothly and reliably and has a long service life and an increased degree of durability for stable operation over an extended period of time.

The invention will now be described in detail by way of example with reference to the accompanying drawings. Other objects and advantages will become apparent from the following description.

DETAILED DESCRIPTION

Figure 1:
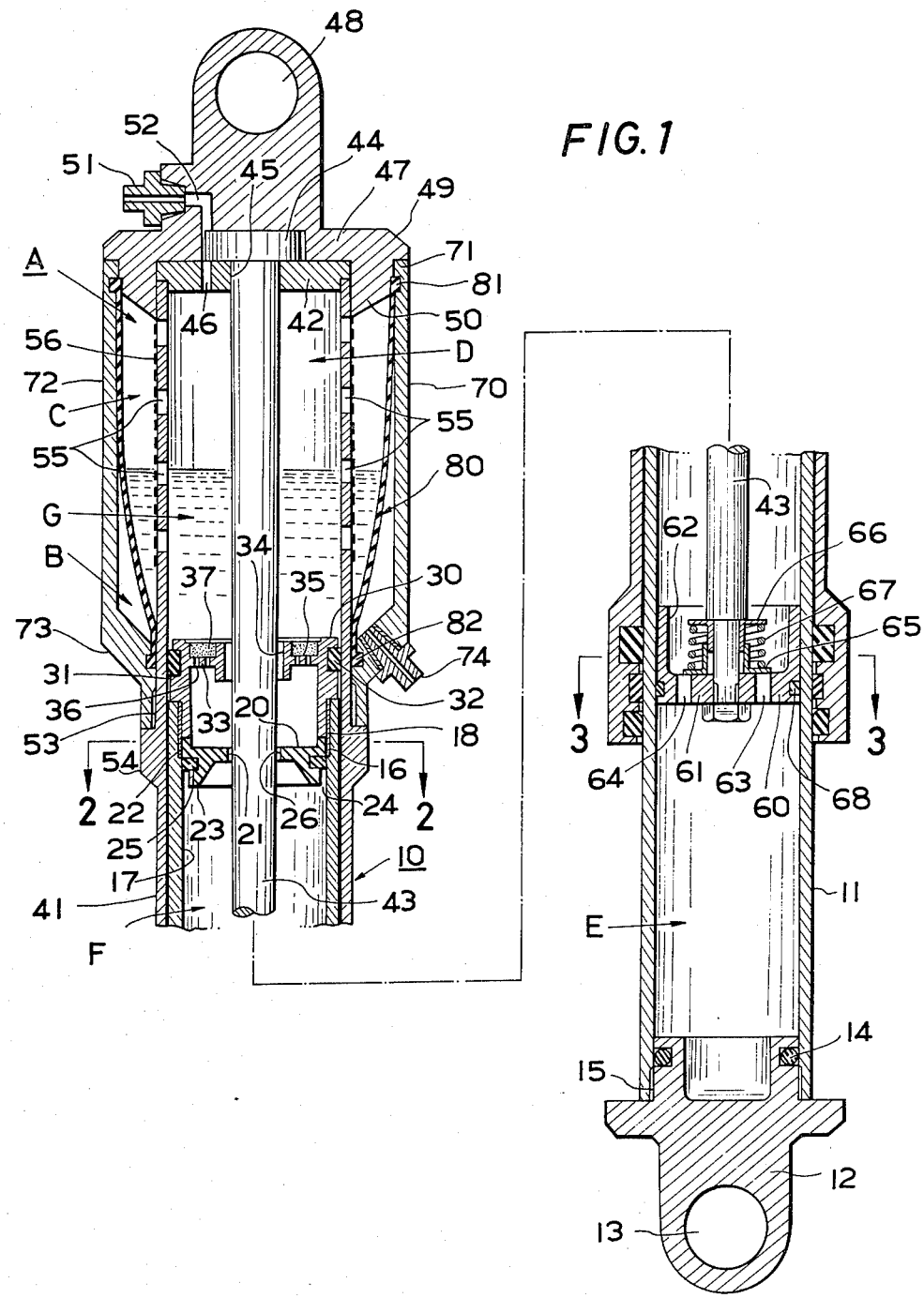
FIG. 1 is a vertical cross-sectional view of a hydraulic shock absorber constructed in accordance with the present invention.

With reference to FIG. 1, there is shown a hydraulic shock absorber 10 according to the present invention. The shock absorber 10 comprises inner and outer tubes 11, 41 respectively, telescopically fitted together. The inner tube 11 is disposed substantially downwardly of outer tube 41 which is fitted over inner tube 11. The lower end of inner tube 11 is closed off by a bottom plug 12 from which integrally extends a mounting portion 13 for attachment to a vehicle body. The bottom plug 12 is threaded at 15 into the lower end of the tube 11 with a sealing member 14 interposed therebetween.

Figure 2:
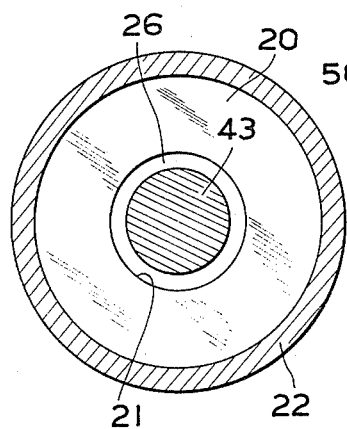
FIG. 2 is an enlarged cross-sectional view, with portions omitted, taken along line 2—2 of FIG. 1.
Figure 3:
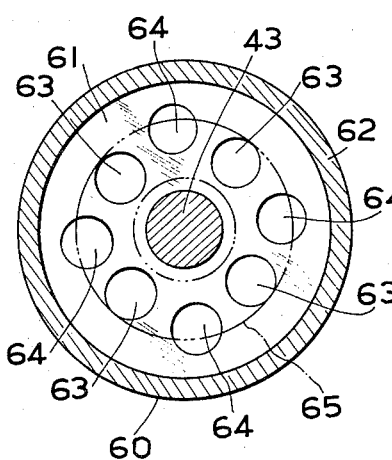
FIG. 3 is an enlarged cross-sectional view, with portions omitted, taken along line 3—3 of FIG. 1.

The inner tube 11 has at the upper portion thereof a partition member 20 having a central circular opening 21 provided therethrough. As shown in FIG. 2, the partition member 20 is ring-shaped and has a flange 22 having at its outer periphery an externally threaded portion engaging at 16 (FIG. 1) with an internally threaded portion of an inner periphery of the upper portion of inner tube 11. Partition member 20 is provided with an annular ring 23 projecting downwardly, there being an annular space 24 between the outer periphery of ring 23 and the inner wall 17 of inner tube 11, with annular space 24 opening downwardly. A sealing member 25 is located at a proximal end of ring 23. An annular orifice 26 is defined by joining a rod, described in detail below, in opening 21.

Located upwardly of partition member 20 is a cylindrical spacer 30, with its lower portion threadedly engaging at 18 with the upper portion of inner tube 11. Spacer 30 is provided in an intermediate portion thereof with an annular projection 31 which is substantially equal in outside diameter to inner tube 11. A sealing member 32 is disposed in an annular recess above annular projection 31. The spacer 30 includes at its upper portion a partition 33 having a central hole 34 around which there is provided an annular recess 35. Partition 33 has a number of small holes 36 extending through the bottom of recess 35. An air bubble suppressor 37 of metal fiber or metal mesh is disposed in recess 35 for breaking air bubbles, the suppressor 37 clogging the small holes 36.

Outer tube 41 supports at the top plug 42 thereof a rod 43 disposed coaxially with tube 41 and projecting downwardly. The rod 43 is of a tapered configuration with its diameter progressively smaller from the upper proximal end toward the lower distal end thereof. Rod 43 vertically extends through the hole 34 and the circular opening 21. The annular orifice 26 is thus defined between the circumference of rod 43 and the wall of circular opening 21, the cross section of orifice 26 being variable by relative movement of rod 43 and opening 21. The rod 43 has at its upper end an enlarged portion 44 located above plug 42, and extends from just below the enlarged portion 44 through a central hole 45 in plug 42, whereby rod 43 is supported in place. The plug 42 includes an air passage 46.

The rod 43 is provided on its lower end with a piston 60 secured thereto and slidably fitted in inner tube 11. The piston 60 is provided with a skirt-shaped spacer 62 which is annular and projects upwardly from a peripheral portion of a bottom 61 of piston 60. The spacer 62 has an upper distal end adapted to be fitted in annular space 24 opening downwardly from partition member 20. The bottom 61 of piston 60 which extends transversely of inner tube 11 has a plurality of orifices 63, 64 extending therethrough and angularly spaced from each other. Orifices 63 are located on an inner imaginary circle concentric with piston 60, and orifices 64 are located on an outer imaginary circle concentric with piston 60. The orifices 63 are angularly spaced at equal intervals and are four in number in the illustrated embodiment, and orifices 64 (also four in number) are disposed intermediately of orifices 63. A slide valve 65 fitted over a lower portion of rod 43 is disposed on piston 60, and is urged against an upper surface of bottom 61 of piston 60 by a spring 67 interposed between an upper surface of valve 65 and a spring seat 66 mounted on a lower portion of rod 43. The outside diameter of valve 65 is such that valve 65 interferes with substantially half areas of outer orifices 64 to thereby limit or reduce the opening thereof. At the same time, valve 65 closes the inner orifices 63. A sealing member 68 is disposed around piston 60.

A cap 47 covering plug 42 of outer tube 41 is provided with an internal mounting portion 48 for attachment to a vehicle body, and is of a larger outside diameter than the outside diameter of outer tube 41, thereby providing a flange 49. Flange 49 has an annular projection 50 extending downwardly from a lower surface of flange 49, the annular projection 50 fitting over an upper end portion of outer tube 41. The cap 47 is provided with an air introduction valve 51 and a passageway 52 communicating with passage 46 in plug 42.

Disposed around the outer periphery of outer tube 41 is a tubular holder 70 having a much larger diameter than the diameter of outer tube 41. Holder 70 has an upper open end 71 fitted over and threadedly engaging with an outer peripheral portion of projection 50 of cap 47. The body 72 of holder 70 is of substantially uniform diameter throughout its length, and the lower end portion 73 thereof is tapered downwardly and threadedly engages with an externally threaded portion 53 of an intermediate portion of outer tube 41. Disposed below the threaded portion 53 of outer tube 41 is an annular projection 54 supporting thereon a lower end of holder 70. Thus, holder 70 is connected coaxially with outer tube 41, there being an annular space A defined between an upper portion of holder 70 and outer tube 41.

The space A is divided into an outer chamber B and an inner chamber C by a partition membrane 80 made of a flexible and resilient material such as rubber. Partition membrane 80 is a tapered hollow cylinder in shape with its diameter being progressively smaller from its upper and central portion toward its lower portion. The partition membrane 80 has at its upper and lower ends thickened annular ribs 81, 82, respectively. Partition membrane 80 is secured in place by inserting it from above between the upper portion of outer tube 41 and holder 70, and then sandwiching upper rib 81 between upper end portion 71 of holder 70 and projection 50, and sandwiching lower rib 82 between an area above threaded portion 53 of outer tube 41 and an inner peripheral wall of a lowest portion 73 of holder 70. More specifically, holder 70 is fitted over outer tube 41 from above and is threadedly mounted in position at its lower end, and the cylindrical partition membrane 80 is inserted while holder 70 and outer tube 41 are being connected at their upper ends by cap 47 threaded in place. The partition membrane 80 can thus be attached concentrically during such assembling process without requiring centering adjustment. When the upper and lower ribs are sandwiched between holder 70 and outer tube 41, partition membrane 80 provides air-tight sealing between chambers B and C.

A valve 74 is mounted on the lowest portion 73 of holder 70 for supplying high-pressure gas into the outer chamber B defined by partition membrane 80.

An upper portion of outer tube 41 is provided with a number of apertures 55 of a relatively large diameter through which the inner chamber C, bounded by partition membrane 80, communicates with an upper chamber D in outer tube 41. The upper portion of tube 41 including the apertures 55 is enclosed by a mesh or network 56 of metal for preventing forced entry of partition membrane 80 into apertures 55.

Inner and outer tubes 11, 41 are supplied with a sealed amount of oil. Inner chamber C and upper chamber D communicating therewith are loaded with a sealed amount of low-pressure gas, and outer chamber B is loaded with a sealed amount of high-pressure gas.

When shock absorber 10 is in the compression stroke, slide valve 65 on piston 60 is lifted to open all of orifices 63, 64 in piston 60 for allowing full communication between a chamber E below piston 60 and a central chamber F above piston 60. Oil flow is restricted and controlled by annular orifice 26 is partition member 20 above central chamber F, thereby generating a damping force during the compression stroke. Orifice 26 is variable because its cross-sectional area is reduced as inner tube 11 is raised over tapered rod 43 during the compression stroke.

During the compression stroke, the low-pressure chamber D, C becomes decreased in volume by an increasing amount of oil in a chamber G above partition member 20. As the pressure in chambers D, C builds up, the partition membrane 80 is bulged outwardly, thereby reducing the volume of high-pressure chamber B. Such action is performed rapidly with preselected pressures in the high-pressure and low-pressure chambers, whereby rapid responsiveness can be assured during the compression stroke. When the tubes have moved a predetermined stroke, reduction of the volume of high-pressure chamber B is discontinued, whereupon a damping force is increased.

During the extension stroke, slide valve 65 fully closes inner orifices 63 in piston 60 and half closes outer orifices 64, to thereby reduce the area of orifices 64 and thus restrict the oil flow therethrough. Accordingly, a damping force is increased during the extension stroke.

In the above described manner, a desired amount of damping force can be obtained by the variable orifice 26 in partition member 20 on the compression stroke, and by orifices 64 in piston 60 on the extension stroke. Because the variable orifice produces a damping force during the compression stroke, the amount of damping force depends on the relative positions of tubes 11 and 41. The variable orifice 26 also provides the same function during the extension stroke, provided that the cross-sectional area of variable orifice 26 is equal to or smaller than the cross-sectional area of orifices 64 controlled by slide valve 65.

During the extension stroke, the volume of chambers C, D increases, and the pressure in chamber B causes partition membrane 80 to adhere to outer tube 41 having apertures 55. Partition membrane 80 is prevented by metal mesh 56 from intruding into apertures 55, and is thus protected against damage.

Even if partition membrane 80 is damaged, bubbles are substantially prevented from entering the oil because chambers B, C and D are located upwardly. The bubbles, as introduced into the oil, are broken up by bubble breaker or suppressor 37 so that temporary removal of a damping force, which would otherwise be caused by large bubbles, is prevented. Bubble suppressor 37 can function when bubbles enter the oil during reciprocating movement of inner and outer tubes 11 and 41. With bubble suppressor 37 being located on the side of the gas chambers and over orifice 26, large bubbles are prevented from passing through orifice 26 so that smooth operation of the shock absorber is ensured.

When piston 60 is raised on the extension stroke, oil forcibly flows upwardly through orifice 26, or during the compression stroke, oil flows up and down to create air bubbles due to such oil disturbances and movements of the shock absorber. Such air bubbles, however, are broken up by bubble suppressor 37 and are suppressed to such an extent that the hydraulic damping action will not be adversely affected.

Figure 5:
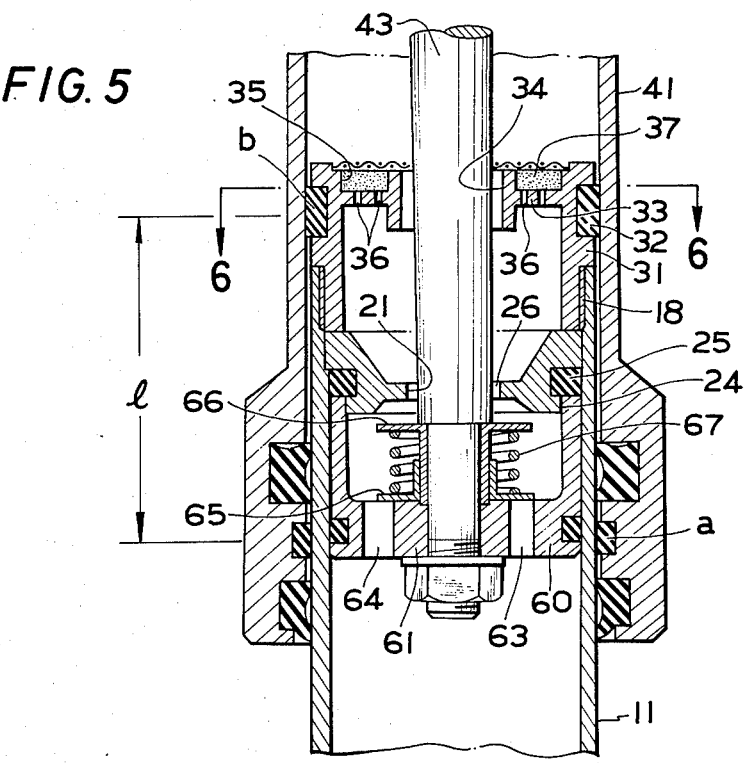
FIG. 5 is an enlarged fragmentary cross-sectional view of the shock absorber at the end of the extension stroke.
Figure 6:
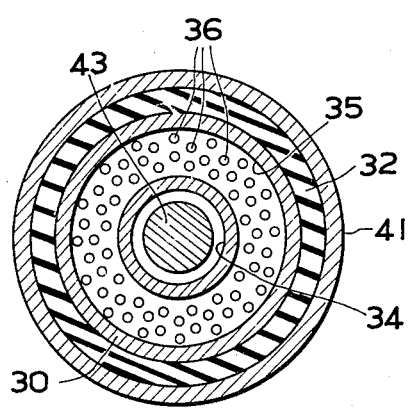
FIG. 6 is a cross-sectional view taken along line 6—6 of FIG. 5.

When inner and outer tubes 11, 41 of absorber 10 are at the end of the extension stroke, the distal end of skirt-shaped spacer 62 of piston 60 enters into space 24 below partition member 20 and abuts against sealing member 25 so as to be located in place. At this time, partition member 20 with orifice 26 is disposed centrally between piston 60 and spacer 30. Accordingly, at the end of the extension stroke, an axial span l is provided between a sliding portion a on a lower end portion of outer tube 41 and a sliding portion b on inner tube 11 adjacent spacer 30, as shown in FIG. 5. The shock absorber, when subjected to lateral forces tending to bend it at the end of the extension stroke, is prevented by the presence of such span l from being bent or broken. With orifice 26 centrally located, deformation of the cross-sectional shape of orifice 26 around vertical rod 43 is substantially eliminated. Accordingly, oil flow is properly governed by orifice 26, and a predetermined damping characteristic is precisely maintained. A positive damping force can be obtained up to the end of the extension stroke, and thus the shock absorber will be operated properly and smoothly.

Figure 4:
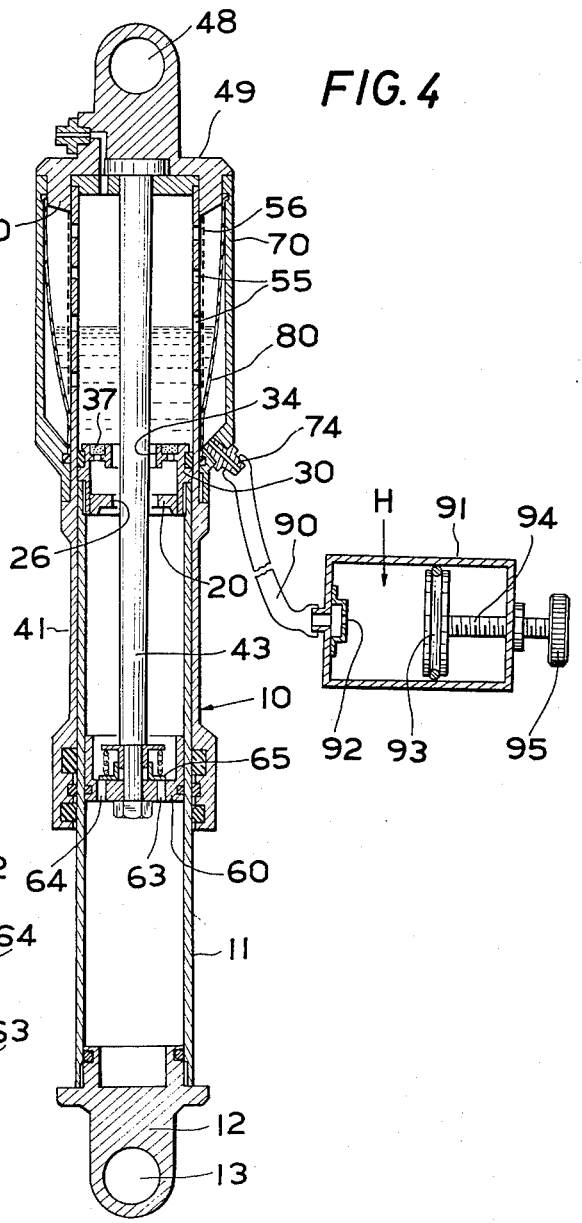
FIG. 4 is a view illustrating a modification according to the invention.

FIG. 4 shows a modification of the present invention, in which the structural details of the shock absorber are the same as the embodiment described above, and in which like reference numerals denote like parts.

The gas supply valve 74 mounted on a lower portion of tubular holder 70 of shock absorber 10 is connected to a pipe 90 which is in turn connected to an adjustment chamber H in a separate container 91. High-pressure chamber B is thus in communication with adjustment chamber H through an orifice 92, and the chambers B, H are filled with a sealed amount of a medium such as Freon gas which is normally in both gas and liquid phases. The volume of adjustment chamber H is variable by the advancing and retracting movement of a piston 93 coupled to a threaded rod 94 to which a knob 95 is connected. Heat generated by frictional sliding movement of inner and outer tubes 11, 41 is absorbed by latent heat of evaporation of the medium, which then functions as a cooling medium. Thus, an increase in springing force caused by heating is suppressed, and changes in the characteristics of the shock absorber due to temperature variations are prevented from occurring, to ensure stable operation.

Figure 7:
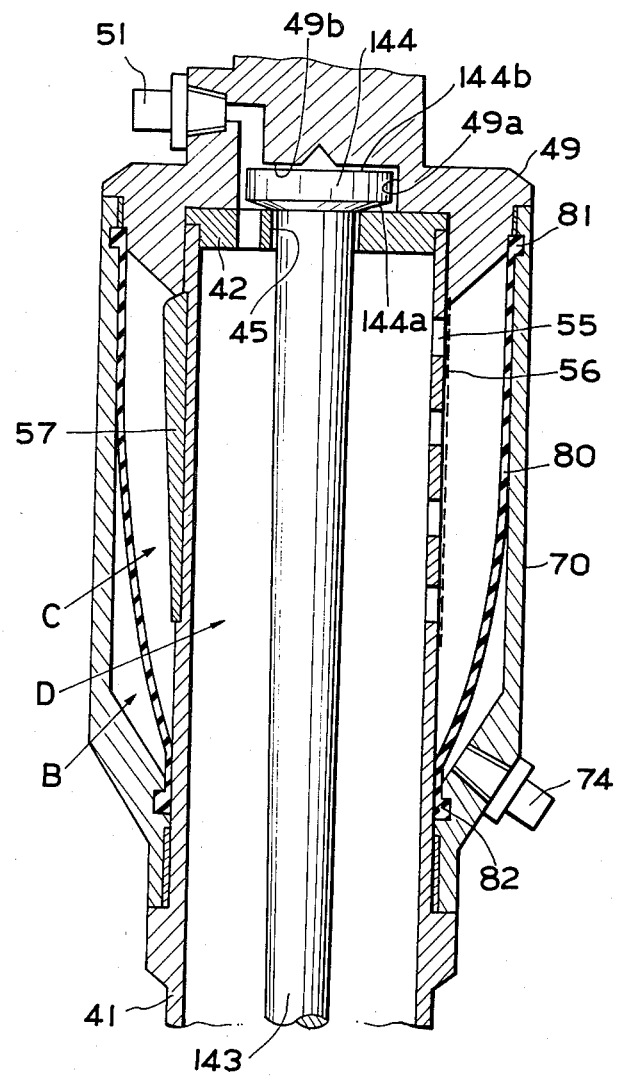
FIG. 7 is an enlarged fragmentary view showing an embodiment of a rod attachment structure according to the invention.
Figure 8:
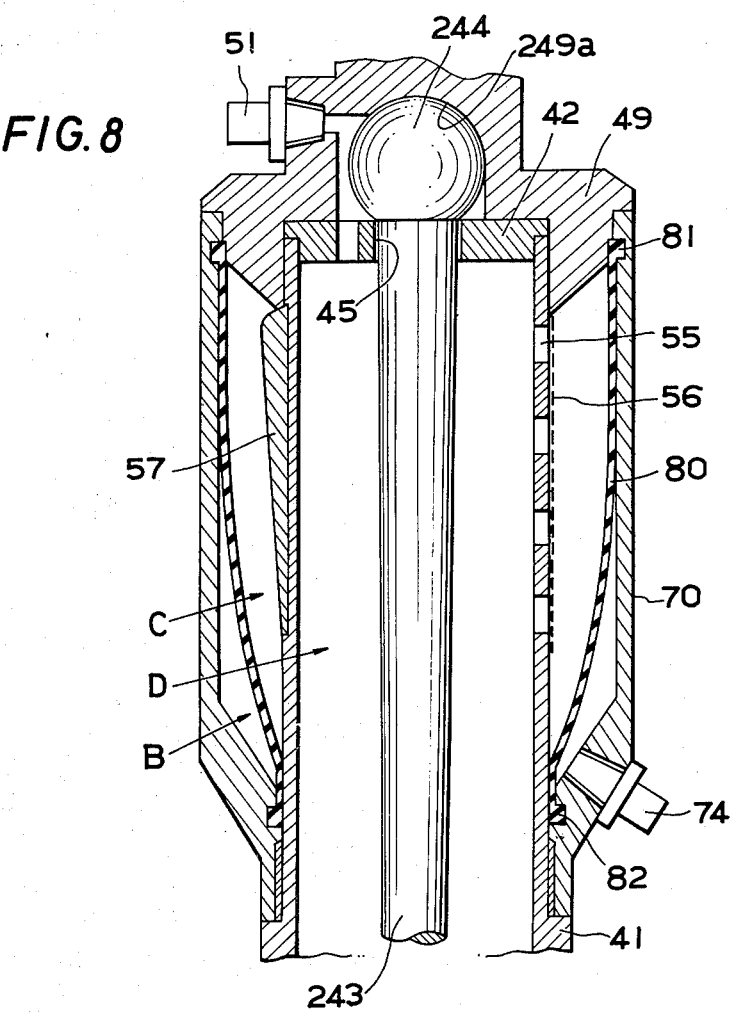
FIG. 8 is a view similar to FIG. 7, showing another embodiment of the invention.
Figure 9:
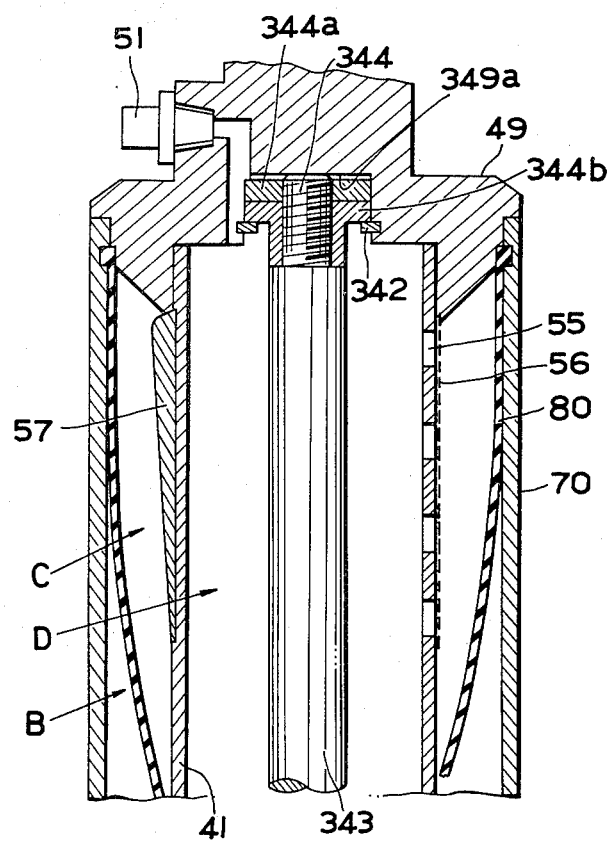
FIG. 9 is a view similar to FIGS. 7 and 8, of yet another embodiment according to the invention.

FIGS. 7 through 9 illustrate various embodiments of a rod mounting structure.

According to the embodiment shown in FIG. 7, a rod 143 has an enlarged base portion 144 having a partially spherical lower surface 144a. A portion of rod 143 just below enlarged base portion 144 extends through the hole 45 in plug 42, and there is a variable clearance between an upper end portion of rod 143 and the wall of hole 45. There is another clearance between a bottom surface 49b of a recess 49a formed centrally in cap 49 and an upper surface 144b of enlarged portion 144.

With such an arrangement, there are three sliding portions, namely, a sliding portion at the upper end of inner tube 11, a sliding portion at the lower end of outer tube 41, and a sliding outer periphery of piston 60 against the inner wall of inner tube 11. When the shock absorber is subjected to bending forces applied laterally, the three sliding portions, because they are rigid, are given internal stresses, which increase as the bending forces increase. Because the portion of rod 143 adjacent piston 60 is of a small diameter, such rod portion, when subjected to lateral forces, tends to make the orifice irregular in cross-sectional shape. However, the upper end of rod 143 is floatingly supported so that rod 143 is shifted in response to bending forces applied on piston 60, inner tube 11 and outer tube 41. Such shifting movement is smoothly effected because of the clearance between enlarged portion 144 and recess 49a and of the partially spherical shape of surface 144a. The stresses applied to the piston and rod are rapidly reduced for smoother operation. Further, as the partition member is shifted in one direction, the rod also moves in that direction for maintaining the proper cross-sectional shape of the orifice.

A plurality of elongated projections 57 are mounted on the upper outer wall of outer tube 41 and located out of alignment with apertures 55, the projections 57 extending in the axial direction of outer tube 41 and being disposed radially of tube 41. Each of the projections 57 is of a tapered contour with its thickness decreasing from its upper to lower end. Due to the provision of projections 57, partition membrane 80 is prevented from being wrinkled when compressed against the outer tube 41. Although the shock absorber of the FIG. 1 embodiment is not provided with such projections 57, it is preferable that such projections 57 be provided.

FIG. 8 shows a second embodiment of a rod mounting structure, in which an enlarged portion 244 of a rod 243 comprises a sphere. The cap 49 has a semispherical recess 249a in which the spherical portion 244 is fitted. The rod 243 thus supported is displaceable for performing the same function as in the previous embodiment.

In accordance with a third embodiment shown in FIG. 9, a rod 343 has a threaded base portion 344 around which double nuts 344a, 344b are threadedly disposed, the threaded portion 344 having a head projecting beyond an upper surface of nut 344a into contact with a bottom surface of a recess 349a. The recess 349a has a greater diameter than that of the nuts 344a, 344b, the nut 344b being retained by a circular clip 342 located at a lower portion of recess 349a. There is thus defined a clearance between the enlarged base portion of rod 343 and recess 349a for movement of rod 343 therein.

Although the invention has been shown and described in detail, it should be understood that various changes and modifications may be made therein without departing from the scope of the appended claims.

We claim:
1. A hydraulic shock absorber for vehicles, comprising:
    an inner tube and an outer tube, said inner and outer tubes being telescopically fitted together;
    a tapered rod supported by said outer tube and extending vertically and axially therefrom, the diameter of said tapered rod progressively decreasing from a proximal end thereof to a distal end thereof;
    said inner tube including a partition member having a hole through which said tapered rod substantially loosely extends;
    an orifice angularly defined between said rod and said hole and variable in response to relative movement of said rod and hole;
    a piston provided on the distal end of said rod, and slidable with respect to said inner tube;
    a lower chamber defined below said piston, and a central chamber defined above said piston and below said partition member;
    said piston being provided with a valved portion adapted to open when said tubes relatively move in one direction to permit substantially full communication between said lower chamber and said central chamber, and adapted to operate to gain a damping force when said tubes relatively move in the opposite direction;
    said piston including a spacer which spaces said valved portion from a lower surface of said partition member when they abut against each other;
    a spacer member separate and distinct from said partition member disposed at an upper end of said inner tube and supported by said partition member for supporting thereon means for breaking up air bubbles passing upwardly and downwardly through said spacer member;
    a tubular holder coaxially disposed around an upper outer peripheral portion of said outer tube and having a diameter larger than the diameter of said outer tube;
    a partition membrane substantially vertically disposed between said holder and said outer tube and mounted substantially coaxially therewith, said partition membrane being fabricated of a substantially flexible and resilient material and being disposed so as to divide a space defined between said holder and said outer tube into a high-pressure gas chamber outside of said membrane and a low-pressure gas chamber inside of said membrane; and
    an upper portion of said outer tube being provided with a number of apertures through which said low-pressure chamber communicates with an upper space within said outer tube.

2. A hydraulic shock absorber according to claim 1, wherein:
    said spacer member includes a recess having a partition part disposed therebelow;
    said partition part is provided with a plurality of through holes extending through to the bottom of said recess; and
    said means for breaking up air bubbles comprises an air bubble suppressor mounted in said recess.

3. A hydraulic shock absorber according to claim 1, wherein:
    said partition member includes a downwardly opening annular space portion;
    said spacer of said piston comprises an annular substantially skirt-shaped spacer projecting upwardly from a peripheral bottom portion of said piston; and an upper distal end of said spacer of said piston is adapted to be fitted within said annular space portion of said partition member so as to keep said piston spaced from a lower surface of said partition member when said upper distal end of said spacer substantially abuts against said lower surface of said partition member.

4. A hydraulic shock absorber according to claim 3, wherein:

an axial span is defined between a lower end portion of said outer tube and a portion of said inner tube adjacent said spacer member when said upper distal end of said spacer substantially abuts against said lower surface of said partition member; and said partition member with said orifice is substantially centrally disposed between said piston and said spacer member when said upper distal end of said spacer substantially abuts against said lower surface of said partition member, to prevent deformation of the shape of said orifice around said tapered rod.

5. A hydraulic shock absorber according to claim 1, wherein:

said upper portion of said outer tube is provided with means for protecting said partition membrane from deformation when said partition membrane is compressed against said outer tube.

6. A hydraulic shock absorber according to claim 5, wherein:

said means for protecting said partition membrane comprises a metal mesh or network substantially enclosing said upper portion of said outer tube having said apertures, said metal mesh or network preventing entry of said partition membrane into said apertures.

7. A hydraulic shock absorber according to claim 5 or 6, wherein:

said means for protecting said partition membrane comprises a plurality of substantially elongated projections mounted on said upper portion of said outer tube so as to be out of alignment with said apertures, to prevent wrinkling of said partition membrane when said partition membrane is compressed against said outer tube.

8. A hydraulic shock absorber according to claim 5 or 6, wherein:

said means for protecting said partition membrane comprises a plurality of substantially elongated projections mounted on said upper portion of said outer tube so as to be out of alignment with said apertures, to prevent wrinkling of said partition membrane when said partition membrane is compressed against said outer tube; and each said projection has a tapered contour, with the thickness thereof decreasing from the upper to the lower end thereof.

9. A hydraulic shock absorber according to claim 1, wherein:

said partition membrane includes a lower end thereof of reduced diameter sandwiched between an inner peripheral portion of said holder and an outer peripheral portion of said outer tube;

a cap is disposed on said outer tube; and said partition membrane further includes an upper end thereof sandwiched between said cap disposed on said outer tube and said holder.

10. A hydraulic shock absorber according to claim 1, wherein:

said high-pressure chamber is connected to a separate chamber;

said high-pressure chamber and said separate chamber is filled with a medium which is normally in both gas and liquid phases; and the volume of said separate chamber is adjustable.

11. A hydraulic shock absorber according to claim 1, wherein:

said rod includes an enlarged base portion fitted in a base portion of said outer tube;

said enlarged portion is supported on said base portion of said outer tube by engagement means; and said rod is slightly movable between said rod base portion and said outer tube base portion.

12. A hydraulic shock absorber according to claim 11, wherein:

said enlarged portion includes a lower inclined surface including a partially spherical surface.

13. A hydraulic shock absorber according to claim 11, wherein:

said enlarged portion is substantially spherical in shape.

14. A hydraulic shock absorber according to claim 11, wherein:

said rod base comprises a threaded portion and a nut threadedly disposed therearound;

a cap is disposed on said outer tube;

said nut has a lower end engaged with said cap on said outer tube; and said threaded portion includes an upper end projecting beyond an upper surface of said nut into contact with a bottom of said cap.

15. A hydraulic shock absorber for vehicles, comprising:

an inner tube and an outer tube, said inner and outer tubes being telescopically fitted together;

a tapered rod supported by said outer tube and extending vertically and axially therefrom;

said inner tube including a partition member having a hole through which said tapered rod substantially loosely extends;

an orifice annularly defined between said rod and said hole and variable in response to relative movement of said rod and hole;

a piston provided on the distal end of said rod;

said piston being provided with a valve adapted to open when said tubes relatively move in one direction and adapted to operate to gain a damping force when said tubes relatively move in the opposite direction;

a tubular holder coaxially disposed around an upper outer peripheral portion of said outer tube and having a diameter larger than the diameter of said outer tube;

a partition membrane substantially vertically disposed between said holder and said outer tube and mounted substantially coaxially therewith, said partition membrane being fabricated of a substantially flexible and resilient material and being disposed so as to divide a space defined between said holder and said outer tube into a high-pressure gas chamber outside of said membrane and a low-pressure gas chamber inside of said membrane;

an upper portion of said outer tube being provided with a number of apertures through which said low-pressure chamber communicates with an upper space within said outer tube; and said upper portion of said outer tube being provided with a metal mesh or network substantially enclosing said upper portion of said outer tube having said apertures, said metal mesh or network preventing entry of said partition membrane into said apertures.

16. A hydraulic shock absorber for vehicles, comprising:

an inner tube and an outer tube, said inner and outer tubes being telescopically fitted together;

a tapered rod supported by said outer tube and extending vertically and axially therefrom;

said inner tube including a partition member having a hole through which said tapered rod substantially loosely extends;

an orifice annularly defined between said rod and said hole and variable in response to relative movement of said rod and hole;

a piston provided on the distal end of said rod;

said piston being provided with a valve adapted to open when said tubes relatively move in one direction and adapted to operate to gain a damping force when said tubes relatively move in the opposite direction;

a tubular holder coaxially disposed around an upper outer peripheral portion of said outer tube and having a diameter larger than the diameter of said outer tube;

a partition membrane substantially vertically disposed between said holder and said outer tube and mounted substantially coaxially therewith, said partition membrane being fabricated of a substantially flexible and resilient material and being disposed so as to divide a space defined between said holder and said outer tube into a high-pressure gas chamber outside of said membrane and a low-pressure gas chamber inside of said membrane;

an upper portion of said outer tube being provided with a number of apertures through which said low-pressure chamber communicates with an upper space within said outer tube; and said upper portion of said outer tube being provided with a plurality of substantially elongated projections mounted on said upper portion of said outer tube so as to be out of alignment with said apertures, to prevent wrinkling of said partition membrane when said partition membrane is compressed against said outer tube.

17. A hydraulic shock absorber according to claim 16, wherein:

each said projection has a tapered contour, with the thickness thereof decreasing from the upper to the lower end thereof.

* * * * *